(12) United States Patent
Alu et al.

(10) Patent No.: US 10,793,127 B2
(45) Date of Patent: Oct. 6, 2020

(54) CAM LOCKING HANDLE ASSEMBLY FOR MANUAL PARK RELEASE

(71) Applicant: KUSTER NORTH AMERICA, INC., Troy, MI (US)

(72) Inventors: Calogero Alu, Shelby Charter Township, MI (US); Brian Andrew Mayville, Northville, MI (US)

(73) Assignee: Kuster North America, Inc., Troy, MI (US)

( * ) Notice: Subject to any disclaimer, the term of this patent is extended or adjusted under 35 U.S.C. 154(b) by 0 days.

(21) Appl. No.: 16/593,177

(22) Filed: Oct. 4, 2019

(65) Prior Publication Data

US 2020/0122701 A1 Apr. 23, 2020

Related U.S. Application Data

(60) Provisional application No. 62/748,575, filed on Oct. 22, 2018.

(51) Int. Cl.
| | |
|---|---|
| *B60T 11/04* | (2006.01) |
| *B60T 1/00* | (2006.01) |
| *F16C 1/18* | (2006.01) |
| *F16H 63/34* | (2006.01) |
| *F16H 61/36* | (2006.01) |
| *F16C 1/10* | (2006.01) |

(52) U.S. Cl.
CPC ............. *B60T 11/046* (2013.01); *B60T 1/005* (2013.01); *F16C 1/101* (2013.01); *F16C 1/18* (2013.01); *F16H 61/36* (2013.01); *F16H 63/3491* (2013.01); *F16C 2361/45* (2013.01)

(58) Field of Classification Search
CPC ........ B60T 11/046; B60T 1/005; B60T 7/101; F16H 63/3491; F16C 1/18
See application file for complete search history.

(56) References Cited

U.S. PATENT DOCUMENTS

| | | | |
|---|---|---|---|
| 3,780,599 A | 12/1973 | Schaefer | |
| 3,839,924 A | 10/1974 | Schaefer | |
| 5,131,288 A * | 7/1992 | Barlas | B60T 7/045 188/2 D |

(Continued)

FOREIGN PATENT DOCUMENTS

| | | | | |
|---|---|---|---|---|
| DE | 29520180 U1 * | 2/1996 | ................ | F16C 1/18 |
| FR | 2760711 A1 * | 9/1998 | ................ | F16C 1/10 |

*Primary Examiner* — Thomas C Diaz
(74) *Attorney, Agent, or Firm* — Dinsmore & Shohl LLP

(57) ABSTRACT

A park release assembly including a package housing with a depth defining base and a cover and a cam component supported in a limited pivotal fashion within the housing. The cam component includes upper and lower portions, each further having an arcuate extending guide surface. A release cable extends in a first direction within the housing and engages the arcuate surface of the lower cam portion. An engagement cable extends in a second crosswise direction relative to the release cable and engages the arcuate surface of the upper cam portion. A pull handle is secured to an end of the engagement cable and, upon outwardly displacing the pull handle, causes concurrent rotation of the cam component in a counter biasing direction in order to linearly displace the release cable in an extending direction in order to actuate a remote lever to a vehicle Park release condition.

19 Claims, 3 Drawing Sheets

(56) References Cited

U.S. PATENT DOCUMENTS

| | | |
|---|---|---|
| 6,619,439 B2 | 9/2003 | Gibson |
| 6,973,851 B2 | 12/2005 | Stadler et al. |
| 9,021,917 B2 | 5/2015 | Koontz et al. |
| 9,423,019 B2 | 8/2016 | Albertson et al. |
| 9,927,028 B2 | 3/2018 | Shin et al. |
| 10,030,770 B2 | 7/2018 | DeVos et al. |
| 2016/0245404 A1 | 8/2016 | Barclay |
| 2017/0009800 A1 | 1/2017 | Lee et al. |
| 2017/0138475 A1 | 5/2017 | Kim et al. |
| 2017/0314677 A1 | 11/2017 | DeVos et al. |
| 2017/0343106 A1 | 11/2017 | Spooner et al. |
| 2018/0094724 A1 | 4/2018 | Devos |
| 2018/0135753 A1 | 5/2018 | Tateno et al. |

* cited by examiner

CAM LOCKING HANDLE ASSEMBLY FOR MANUAL PARK RELEASE

CROSS REFERENCE TO RELATED APPLICATIONS

The present application claims the priority of U.S. Ser. No. 62/748,575 filed Oct. 22, 2018.

FIELD OF THE INVENTION

The present invention teaches a cable actuating mechanism incorporating a rotatable cam element exhibiting a separate pull handle and cable arranged in an angular offset fashion relative to a Park position release transmission cable. The offset angular (such as crosswise) extending pull handle operates in combination with a redesigned cam component, this including upper and lower arcuate guiding surfaces supporting ends of the engagement and release cable, and in order to ensure a straight/linear translating motion of the release cable during actuation of the cam component, this in comparison to the prior art (Hi-Lex) manual park release system with arcuately pivoting cable connected to the transmission.

BACKGROUND OF THE RELEVANT ART

The relevant prior art includes the Hi Lex group of references (US 2017/0314677, 2018/0094724 and U.S. Pat. No. 10,030,770) each of which teaches a degree of arcuate travel of the transmission cable via the configuration of an associated pull handle. Additional references which include similar arcuate handle and release cable designs also include each of Shin U.S. Pat. No. 9,927,028, Lee 2017/0009800 and Kim 2017/0138475.

Additional references teach exclusive linear translation of a park brake release cable, via other structural linkages. These are referenced by each of Shafer U.S. Pat. No. 3,780,599 (see linkage positions of FIGS. 4-5), Gibson U.S. Pat. No. 6,619,439 (first 4 and second 6 cables interconnected by a pivot lever 14) and Albertson U.S. Pat. No. 9,423,019 (see manual park release actuator in FIGS. 8-9 with linkage style flex cable 152).

SUMMARY OF THE PRESENT INVENTION

The present invention teaches a park release assembly including a package housing with a depth defining base and a cover and a cam component supported in a limited pivotal fashion within the housing. The cam component includes upper and lower portions, each further having an arcuate extending guide surface.

A release cable extends in a first direction within the housing and engages the arcuate surface of the lower cam portion. An engagement cable extends in a second crosswise direction relative to the release cable and engages the arcuate surface of the upper cam portion. A pull handle is secured to an end of the engagement cable and, upon outwardly displacing the pull handle, causes concurrent rotation of the cam component in a counter biasing direction in order to linearly displace the release cable in an extending direction in order to actuate a remote lever to a vehicle Park release condition.

Additional features include an edge extending recess channel associated with the arcuate surfaces of the cam portions for securing the engagement and release cables. A guide channel network is configured upon an upper surface of the upper portion of the cam component, a cam follower being supported in displaceable fashion within a linear channel defined in the cover and traveling, in response to pivoting rotation of the cam component, along the guide channel network between an initial abutment position, and intermediate catch location depicting a Park release condition, and a reverse translating and reset to said initial position to define a Park reset position.

Other features include a torsional spring for influencing the cam component in a counter rotating biased direction opposing the engagement cable. Any of a radius or circumferential offset can further be established between the arcuate extending guide surfaces of the upper and lower cam components. The engagement and release cables also can be arranged at any angular offset relative to each other, including in crosswise extending directions to one another not limited to ninety degrees.

Other and additional features include the package housing adapted to being secured to a vehicle location so that the pull handle is adapted to being actuated by a user in an upward or upward angled direction. The release cable can also extend through a shelf shaped superstructure support located proximate the package housing and connected therewith by a pair of flange supports. The housing can exhibit a generally oblong configuration, with the assembled base and cover each further including a mating projection which support therebetween the pull handle.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
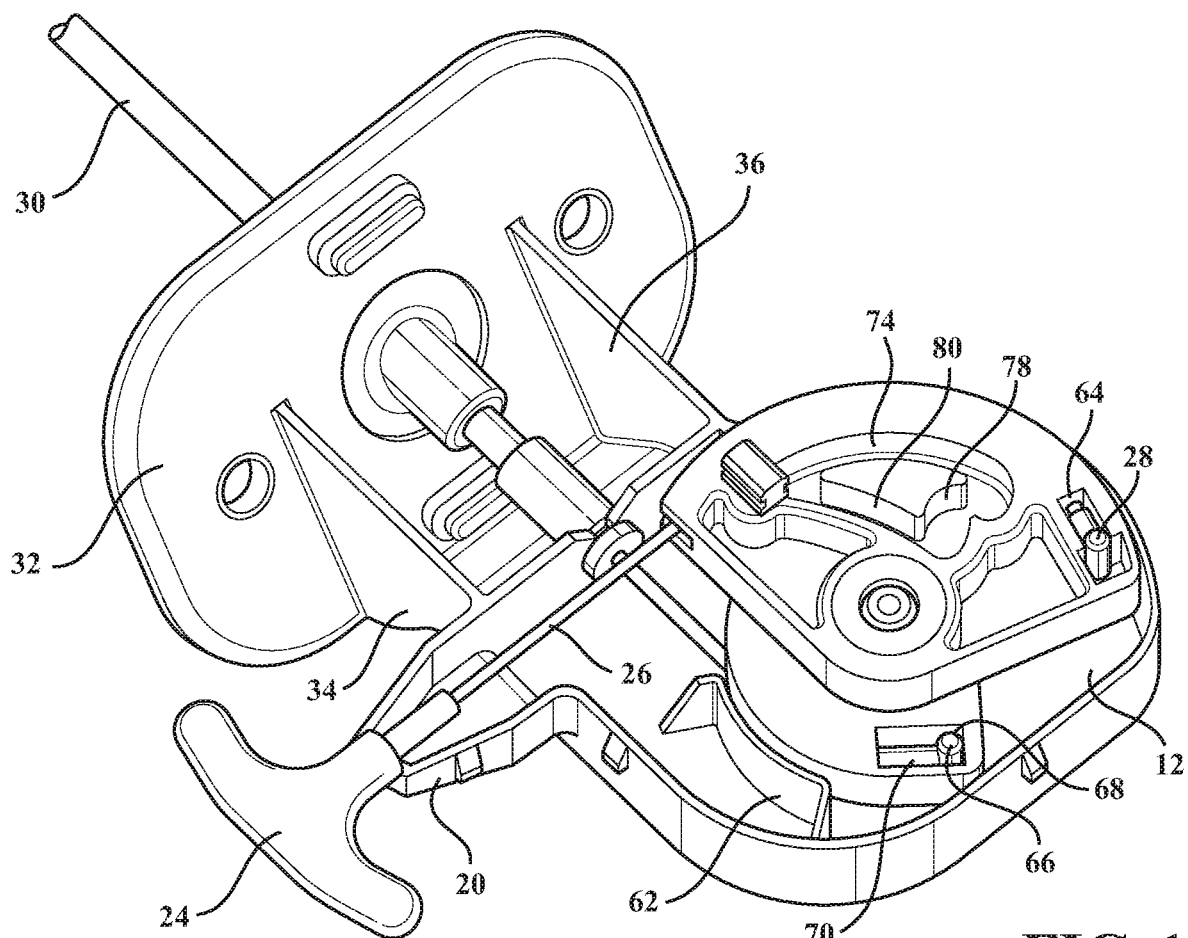
FIG. 1 is a partially cutaway perspective of the cable actuating mechanism according to the invention in a pre-actuated position and illustrating the cam component and pivot guide supported cam follower element in their initial position with respect to the angularly offset extending pull handle and secured engagement cable, a release cable extending at an offset angular (such as ninety degree) relationship relative to the engagement cable, with an end of the release cable engaged to a coaxial pivotally supported and circumferentially offset arcuate guide surface associated with a lower portion of the cam component.
Figure 2:
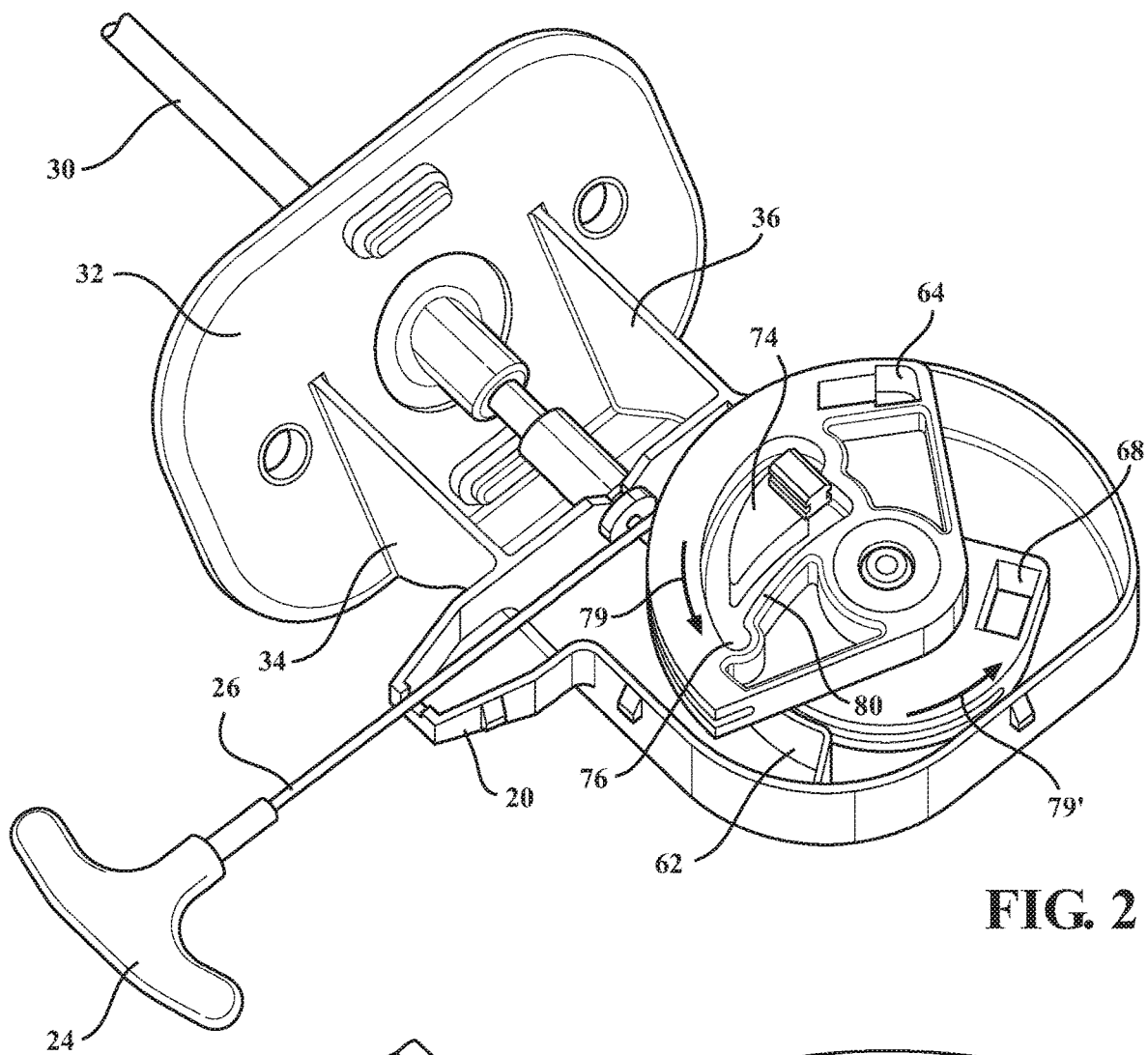
FIG. 2 is a similar view to FIG. 1 illustrating the concurrent pivotal displacement of the cam component for transferring the crosswise and lateral displacement of the pull handle and engagement cable to linearly translate the release cable as directed by an arcuate guiding translation of the engaging end of the release cable against the supporting arcuate guide surface of the lower portion of the rotatable cam component, the cam follower travelling along a guide channel configured within an upper surface of an upper portion of the cam component to an intermediate catch location for retaining the component in the Park release position and prior to a further minimal pull handle actuation to reverse displace the cam component to the initial Park engagement position.
Figure 3:
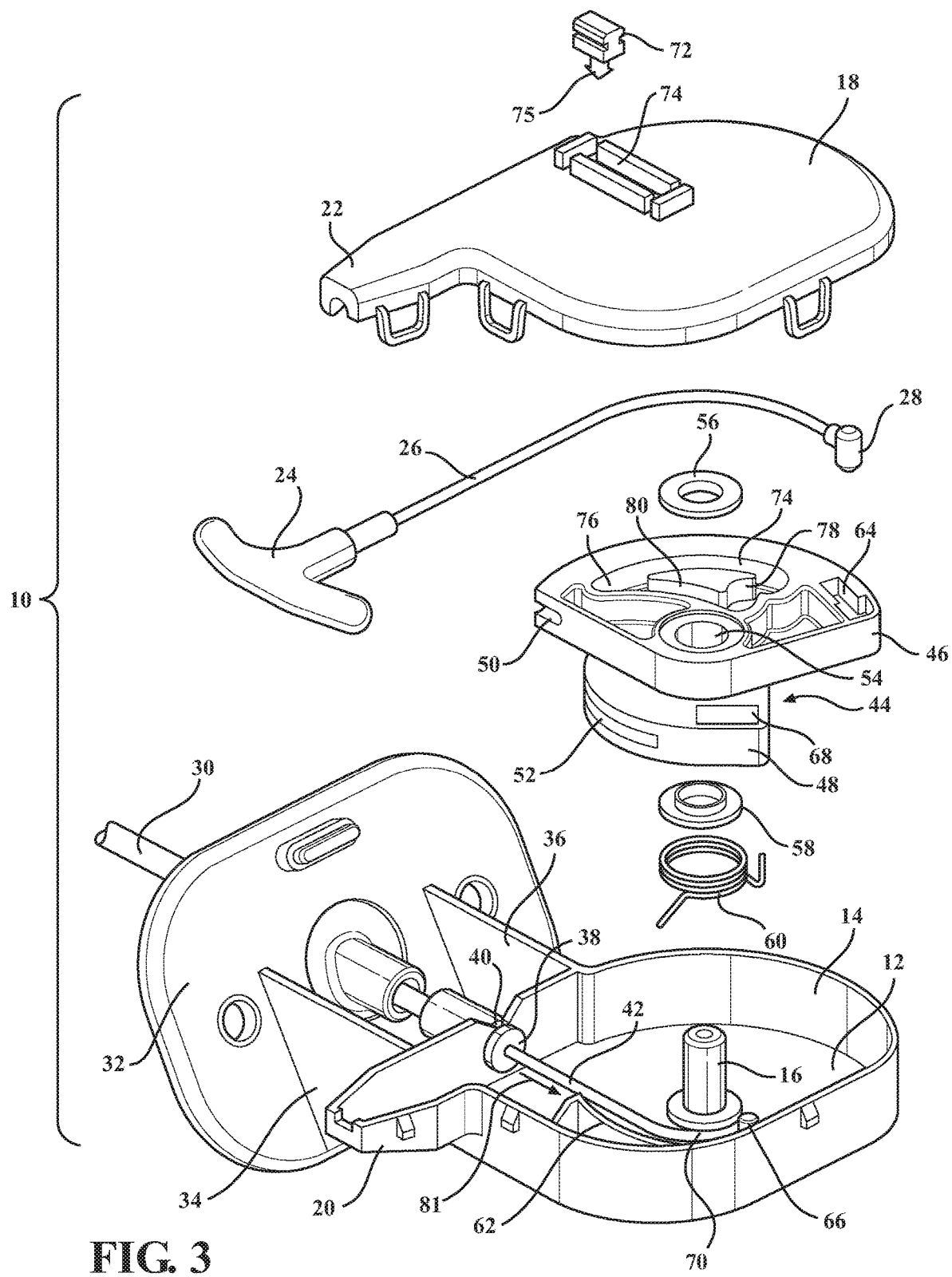
FIG. 3 is an exploded view of the cable actuating release mechanism of the present invention.

With reference to FIGS. 1-3, the present invention teaches a cable actuating (CAM) mechanism, generally at 10 in FIG. 3, exhibiting a separate pull handle and cable arranged in an angular offset (not limited to ninety degree) fashion to a main park release transmission cable. As will be further described in reference to the attached illustrations, the offset angular/crosswise extending pull handle operates in combination with a cam component with upper and lower arcuate guide supporting surfaces to ensure a straight/linear motion of the transmission lever release cable during translation, this in comparison to the prior art (Hi-Lex) manual park release system with arcuately pivoting cable connected to the transmission.

As further described, the current technology utilizes a rigid handle with or without a tether for providing the necessary mechanical advantage for the user to apply the necessary load in order translate the Park position release cable to in turn actuate the transmission lever. The proposed redesign of the park release mechanism additionally combines a second angularly offset (such as including but not limited to being cross directed at a ninety degree or any other variation or offset) of a pull handle supporting an engagement cable which is connected to such as a lower arcuate guide surface associated with a lower portion of the rotatable cam component.

Initial reference is made to the exploded view of the cable actuating release mechanism of the present invention as shown in FIG. 3. This includes a package defining housing with a base 12 and depth establishing side wall 14. A axial defining sleeve or collar 16 is depicted extending upwardly from an interior location of the base 14.

A cover 18 assembles over the base 12 to define the interior package space. The dimensions of the housing provide it with a generally oblong configuration, with the assembled base and cover each further including a mating projection (see at 20 for the base and further at 22 for the cover) which support therebetween a crosswise directed pull handle 24, from which further extends an engagement cable 26. An enlarged end portion 28 of the cable 26 is further shown.

A separate release cable 30 is also shown which extends from a remote located release lever associated with such as an automatic transmission (not shown), the actuation of which in the engaged position allowing the vehicle to shift into Neutral gear when the motor is off. The release cable 30 extends through a shelf shaped superstructure support 32 which is located proximate the base 12 of the package housing and is connected therewith by a pair of flange supports 34 and 36. A guide washer 38 is further depicted secured to a notched location 40 in the outer wall 14 of the base at a location for receiving an inner translating portion 42 of the release cable.

A cam component is generally represented at 44 (see again FIG. 3) and includes an upper portion 46 and a lower (typically integrally formed) portion 48. The upper cam portion 46 has an arcuate edge guiding surface further defining an arcuate receiving channel 50, with the lower cam portion 48 also including a further offset arcuate edge guiding surface further defining a separate arcuate receiving channel 52.

As shown, the upper 46 and lower 48 cam components can, without limitation, be integrated into a single piece with the associated upper 50 and lower 52 arcuate surfaces likewise being circumferentially and, optionally, radially offset from one another in order to define a desired cam rotation and conversion to linear displacement profile resulting from the actuation of the engagement cable 26 and resultant linear translation of the inner translating portion 42 of the transmission release cable 30. Without limitation, this can again include establishing any angular orientation between the extending direction of the pull handle 24 supported engagement cable 26 relative to the linear translating inner cable portion 42 of the release cable and so that the cam component 44 provides a mechanical advantage over smaller sized pulley configurations.

A through aperture (see inner rim defining surface 54) in the cam component 44 allows it to be assembled upon the upwardly extending locating collar 16. A pair of upper and lower locating support bushings (at 56 and 58 in FIG. 3) are provided on opposite upper and lower annular rim locations of the cam component upper and lower portions. A torsional spring 60 is further depicted (FIG. 3) with first and second engagement legs extending between the combination component and the base structure and, with subsequent reference to FIGS. 1-2, biases the cam component in a clockwise direction. Also depicted at 62 is an internal arcuate guide wall which is supported upon the bottom or base 12 surface, the guide wall 62 opposing and defining a minimal clearance with the arcuate edge surface 52 of the lower cam portion 48.

The engagement cable 26 seats within the arcuate recess 50 associated with the upper cam portion 46, with the enlarged and crosswise extending pin end 28 of the cable 26 seating within an open interior location 64 proximate an opposite end of the upper cam portion arcuate edge 50. The inner translation portion 42 of the release cable 30 further engages through the offset arcuate edge and receiving channel 52 of the lower cam portion 48 (see also FIG. 1), the inner translating portion 42 further including an enlarged end 66 which is received within a retaining opening 68 proximate an end of the arcuate surface of the lower cam portion 48.

As further best shown in FIGS. 1 and 3, a coil spring 70 is seated around an end of the inner translation portion 42 in contact with its enlarged end 66. As will be further described, the biasing nature of the spring 70 assists in establishing the park release engagement and release (return to Park) as described in FIGS. 1 and 2 and, as will be further described, include the ability to displace a cam follower 72 described below from its intermediate Park release condition to a return rotation of the cam component back to the initial Park engaged position.

The cam follower 72 is further shown and seats (is displace-able supported) within a linear guide channel 74 defined in the cover 18. The cam follower further includes a lower projection 75 (FIG. 3) which, upon assembly is received within the guide channel network configured within an upper surface of the upper cam portion 46.

Figure 1A:
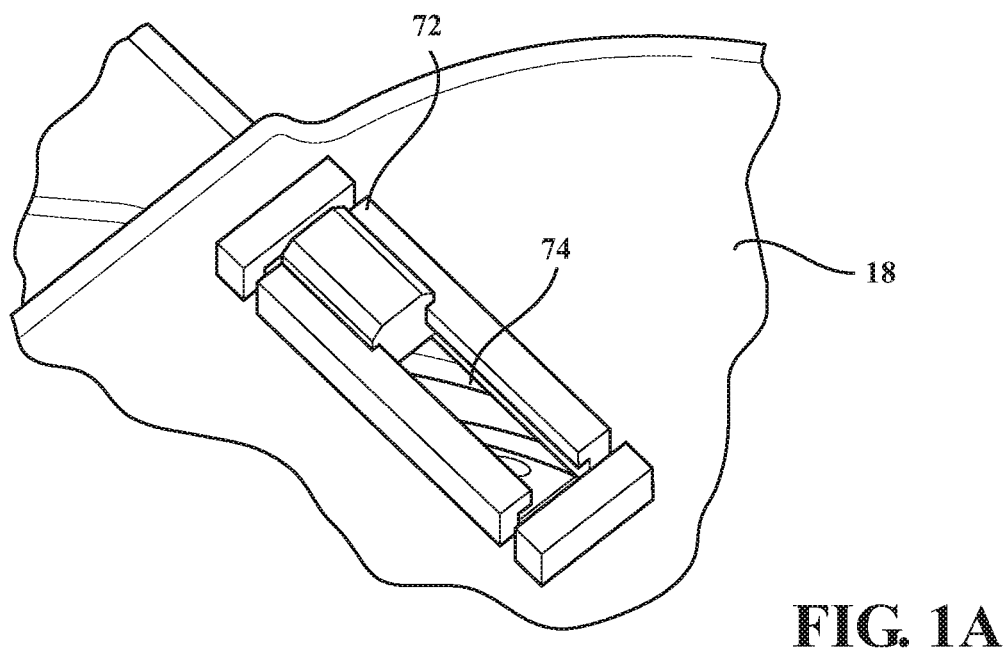
FIG. 1A is an enlarged partial view of the lock element and attached cover with supporting guide slot in the position of FIG. 1.

The guide channel 74 includes a first abutment location 76 (see FIGS. 2-3) which defines a position of the cam follower 72 in FIGS. 1 and 1A. The guide channel further includes an intermediate catch location 78 (see also FIG. 1) which, in the engaged position of FIGS. 2-2A, defines a engaged (Park release) condition and by which the cam follower 72 travels along the first guide channel 74 from the first location 76 to the intermediate location 78. Finally, a second return guide channel 80 is configured in arcuate extending fashion between the intermediate catch location 78 and the first abutment location 76 in order to reset the cam follower back to the Park position of FIG. 1, this occurring upon a minimal follow up pulling on the engagement cable transferring the cam follower 72 out of the intermediate abutment location 78 for travel back to the initial Park position.

Referring now to FIG. 1, a partially cutaway perspective of the cable actuating mechanism (with the cover removed) depicts a pre-actuated position and illustrating the upper cam portion 46 and pivot guide supported cam follower 72 in their initial position with respect to the angularly offset or crosswise extended extending pull handle 24 and secured engagement cable 26. The release cable 30 with inner translating portion 42 is further shown extending at a ninety degree angle relative to the engagement cable 26, with the end of the release cable engaged to the coaxial pivotally supported and offset lower cam portion 48 in the manner previously described. FIG. 1A further again provides an enlarged partial view of the lock element and attached cover with supporting guide slot in the position of FIG. 1.

FIG. 2 is a similar view to FIG. 1, and illustrating the concurrent pivotal displacement of the upper cam portion 46 and lower cam portion 48 for transferring the crosswise and lateral displacement of the pull handle 24 and engagement cable 26 to linearly translate the release cable as directed by an arcuate guiding translation of the engaging end of the release cable against the supporting guide surface (including recessed receiving channel 52) of the lower cam portion. The cam follower 72 travels along a guide channel network, this further including the guide channel 74 configured within an upper surface of the upper cam portion (again between the initial abutment location 76 to the intermediate catch location 78), again for retaining the guide in the engaged position. The direction of actuation is further represented by arrows 79 and 79' associated with the cam component, with concurrent linear translation arrow 81 (FIG. 3) of the inner translating portion 42 of the release cable.

Figure 2A:
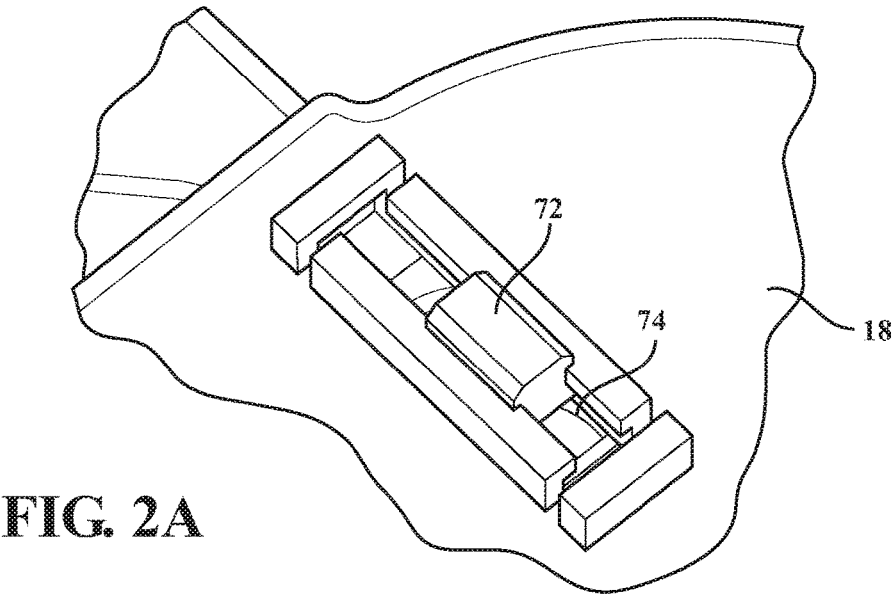
FIG. 2A is an enlarged partial view similar to FIG. 1A illustrating the cam follower being displaced along the slot to the position shown in FIG. 2.

As further shown, the catch location 78 exhibits upper and lower reverse bend portions, the catch element supporting at an intermediate recessed shoulder of the catch location, and prior to a further (minimal) actuation of the pull handle 24 (not shown) in order to reverse displace the cam follower 72 out of the recessed shoulder at the intermediate catch location 78, and so that the lock element can pass through the lower reverse slope at the catch location 78 and then travel in a reverse interconnected arcuate direction along channel 80, also forming a portion of the guide channel network, back to the initial Park re-engagement position consistent with the inner cable 42 retracting out of the housing to the extent necessary to reset the remote transmission lever. Finally, FIG. 2A is an enlarged partial view similar to FIG. 1A illustrating the cam follower 72 displaced along the slot to the position shown in FIG. 2.

Accordingly, the main release/transmission cable 30 and offset (or cross wise extending) pull or engagement cable 26 are respectively connected to the offset arcuate surfaces associated with the upper 46 and lower 48 cam portions, respectively, and so that, upon the cable actuating mechanism being actuated by the cross engagement cable 26, results in the inner cable 42 being influenced by the arcuate profile of the lower surface 52 in order to translate/displace in an exclusively linear direction in order to pull the cable inwardly to engaged the Park release position. As further previously described, a (minimal) repeat pull motion resets the cable in an opposite direction in order to disengage the park release.

Having described my invention, other and additional preferred embodiments will become apparent to those skilled in the art to which it pertains, and without deviating from the scope of the appended claims. This can further include the housing and assembly to be oriented in any arrangement or direction such that the pull handle can be actuated in any direction, such as when the mechanical advantage of the dual pulleys is required. This can also include the mechanism can be mounted vertically so the pull handle 24 can be oriented for actuation in an upward or upward angled motion/direction.

We claim:

1. A park release assembly, comprising:
a housing with a depth defining base and a cover;
a cam component pivotally supported within said housing and including upper and lower portions, each further having an arcuate extending guide surface;
a guide channel network configured upon said cam component;
a cam follower displaceably supported within said cover, said cam follower extending within said guide channel network so that, in response to pivoting rotation of said cam component, concurrently displacing within said cover and along said guide channel network between each of an initial position, a Park release position, and a Park reset position;
a release cable extending in a first direction within said housing and engaging said arcuate surface of said lower cam portion;
an engagement cable extending in a second crosswise direction relative to said release cable and engaging said arcuate surface of said upper cam portion; and
a pull handle secured to an end of said engagement cable and, upon outwardly displacing said pull handle, causing concurrent rotation of said cam component in a counter biasing direction in order to linearly displace said release cable in an extending direction in order to actuate a remote lever to a vehicle Park release condition.

2. The park release assembly of claim 1, further comprising an edge extending recess channel associated with said upper and lower arcuate surfaces of said cam component for securing said engagement and release cables.

3. The park release assembly of claim 1, further comprising said guide channel network configured upon an upper surface of said upper portion of said cam component, said Park release position further including an intermediate catch location.

4. The park release assembly of claim 1, further comprising a torsional spring for influencing said cam component in a counter rotating biased direction opposing said engagement cable.

5. The park release assembly of claim 1, further comprising any of a radius or circumferential offset established between said arcuate extending guide surfaces of said upper and lower cam components.

6. The park release assembly of claim 5, further comprising said engagement and release cables being arranged at any angular offset relative to each other.

7. The park release assembly of claim 6, further comprising said engagement and release cables being arranged in crosswise extending directions to one another.

8. The park release assembly of claim 5, further comprising said housing adapted to being secured to a vehicle location so that said pull handle is adapted to being actuated by a user in an upward or upward angled direction.

9. The park release assembly of claim 1, further comprising said release cable extending through a superstructure support located proximate said housing and connected therewith by a pair of flange supports.

10. The park release assembly of claim 1, further comprising said housing exhibiting an oblong configuration, with said assembled base and cover each further including a mating projection which support therebetween said pull handle.

11. A park release assembly, comprising:
a housing exhibiting an oblong configuration with a depth defining base and a cover;
a cam component pivotally supported within said housing and including upper and lower portions, each further having an arcuate extending guide surface;
a guide channel network configured upon an upper surface of said upper portion of said cam component, a cam follower being supported in displaceable fashion within a linear channel defined in said cover and traveling, in response to pivoting rotation of said cam component, along said guide channel network between an initial abutment position, and intermediate catch location depicting a Park release condition, and a reverse translating and reset to said initial position to define a Park reset position;
a release cable extending through a shelf shaped superstructure mounted in proximity to said housing in a first direction within said housing and engaging said arcuate surface of said lower cam portion;
an engagement cable extending in a second crosswise direction relative to said release cable and engaging said arcuate surface of said upper cam portion;
a torsional spring for influencing said cam component in a counter rotating biased direction opposing said engagement cable; and
a pull handle seated within mating projections of said base and cover and secured to an end of said engagement cable and, upon outwardly displacing said pull handle, causing concurrent rotation of said cam component in a counter biasing direction in order to linearly displace said release cable in an extending direction in order to actuate a remote lever to a vehicle Park release condition.

12. The park release assembly of claim 11, further comprising an edge extending recess channel associated with said upper and lower arcuate surfaces of said cam component for securing said engagement and release cables.

13. The park release assembly of claim 11, further comprising any of a radius or circumferential offset established between said arcuate extending guide surfaces of said upper and lower cam components.

14. The park release assembly of claim 13, further comprising said engagement and release cables being arranged at any angular offset relative to each other.

15. The park release assembly of claim 14, further comprising said engagement and release cables being arranged in crosswise extending directions to one another.

16. The park release assembly of claim 13, further comprising said housing adapted to being secured to a vehicle location so that said pull handle is adapted to being actuated by a user in an upward or upward angled direction.

17. A park release assembly, comprising:
a housing with a depth defining base and a cover;
a cam component pivotally supported within said housing and including upper and lower portions, each further having an arcuate extending guide surface;
a guide channel network configured upon an upper surface of said upper portion of said cam component, a cam follower being supported in displaceable fashion within a linear channel defined in said cover and traveling, in response to pivoting rotation of said cam component, along said guide channel network between an initial abutment position, and intermediate catch location depicting a Park release condition, and a reverse translating and reset to said initial position to define a Park reset position;
a release cable extending in a first direction within said housing and engaging said arcuate surface of said lower cam portion;
an engagement cable extending in a second crosswise direction relative to said release cable and engaging said arcuate surface of said upper cam portion; and
a pull handle secured to an end of said engagement cable and, upon outwardly displacing said pull handle, causing concurrent rotation of said cam component in a counter biasing direction in order to linearly displace said release cable in an extending direction in order to actuate a remote lever to a vehicle Park release condition.

18. The park release assembly of claim 17, further comprising an edge extending recess channel associated with said upper and lower arcuate surfaces of said cam component for securing said engagement and release cables.

19. The park release assembly of claim 17 further comprising a torsional spring for influencing said cam component in a counter rotating biased direction opposing said engagement cable.

* * * * *